(12) United States Patent
Stolowitz

(10) Patent No.: US 8,281,067 B2
(45) Date of Patent: Oct. 2, 2012

(54) DISK ARRAY CONTROLLER WITH RECONFIGURABLE DATA PATH

(75) Inventor: Michael C. Stolowitz, Danville, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2619 days.

(21) Appl. No.: 10/829,918

(22) Filed: Apr. 21, 2004

(65) Prior Publication Data

US 2004/0264309 A1    Dec. 30, 2004

Related U.S. Application Data

(60) Provisional application No. 60/464,892, filed on Apr. 21, 2003.

(51) Int. Cl.
*G06F 12/00* (2006.01)
(52) U.S. Cl. .................. 711/114; 711/E12.001
(58) Field of Classification Search .......... 711/114, 711/E12.001
See application file for complete search history.

(56) References Cited

U.S. PATENT DOCUMENTS

| | | | |
|---|---|---|---|
| 4,514,823 A | 4/1985 | Mendelson et al. | |
| 5,003,558 A | 3/1991 | Gregg | |
| 5,038,320 A | 8/1991 | Heath et al. | |
| 5,072,378 A | 12/1991 | Manka | |
| 5,151,977 A | 9/1992 | Fredericks et al. | |
| 5,185,862 A | 2/1993 | Casper et al. | |
| 5,257,391 A | 10/1993 | DuLac et al. | ............... 395/800 |
| 5,268,592 A | 12/1993 | Bellamy et al. | |
| 5,392,425 A | 2/1995 | Elliott et al. | |
| 5,428,649 A | 6/1995 | Cecchi | |
| 5,471,581 A | 11/1995 | Munier et al. | |
| 5,491,804 A | 2/1996 | Heath et al. | |
| 5,537,567 A * | 7/1996 | Galbraith et al. | ............. 711/114 |
| 5,568,629 A * | 10/1996 | Gentry et al. | ................. 711/114 |

(Continued)

FOREIGN PATENT DOCUMENTS

EP    0 578 139 A2    7/1993

(Continued)

OTHER PUBLICATIONS

Kozierok, Charles M. Striping. [online] Apr. 17, 2001, [retrieved on Jun. 22, 2007]. Retrieved from the Internet <URL: http://www.pcguide.com/ref/hdd/perf/raid/concepts/genStriping-c.html>.*

(Continued)

*Primary Examiner* — Kevin Ellis
*Assistant Examiner* — Larry MacKall
(74) *Attorney, Agent, or Firm* — Zilka-Kotab, PC

(57) ABSTRACT

A disk array controller apparatus (10) is disclosed having at least two logical ports (Logical Port #0-Logical Port #3) for interfacing with a host (12) and having one or more physical ports (Physical Port #0-Physical Port #4), each physical port arranged for attaching at least one disk drive to the controller, and the controller including a switch (26), the switch providing dynamically configurable data paths (30) between the logical data ports and physical data ports, responsive to the contents of a Mapping Register (24). The Mapping Register defines a desired disk drive array by specifying an association of each logical port to one of the physical ports. The mapping register can be organized as a logical mapping register, comprising a field for each logical port of the controller, and includes provision for designating a redundant array for RAID operations.

27 Claims, 16 Drawing Sheets

U.S. PATENT DOCUMENTS

| | | | |
|---|---|---|---|
| 5,581,715 | A | 12/1996 | Verinsky et al. |
| 5,608,891 | A | 3/1997 | Mizuno et al. |
| 5,619,723 | A | 4/1997 | Jones et al. |
| 5,765,186 | A | 6/1998 | Searby |
| 5,771,372 | A | 6/1998 | Pham et al. |
| 5,794,063 | A | 8/1998 | Favor |
| 5,801,859 | A | 9/1998 | Yamamoto |
| 5,845,319 | A | 12/1998 | Yorimitsu ............... 711/114 |
| 5,890,014 | A | 3/1999 | Long |
| 5,964,866 | A | 10/1999 | Durham et al. |
| 6,018,778 | A | 1/2000 | Stolowitz ............... 710/61 |
| 6,098,114 | A | 8/2000 | McDonald et al. |
| 6,098,128 | A | 8/2000 | Velez-McCaskey et al. |
| 6,105,146 | A | 8/2000 | Tavallaei et al. |
| 6,151,641 | A | 11/2000 | Herbert |
| 6,151,685 | A | 11/2000 | Li et al. |
| 6,161,165 | A | 12/2000 | Solomon et al. |
| 6,237,052 | B1 | 5/2001 | Stolowitz |
| 6,513,098 | B2 | 1/2003 | Allingham |
| 6,665,773 | B1 | 12/2003 | McCombs |
| 6,772,108 | B1 | 8/2004 | Stolowitz |
| 6,886,068 | B2 | 4/2005 | Tomita |
| 6,999,476 | B2 * | 2/2006 | Lerman et al. ............ 370/470 |
| 7,743,275 | B1 | 6/2010 | Tormasov et al. |
| 7,913,148 | B2 | 3/2011 | Stolowitz |
| 8,065,590 | B2 | 11/2011 | Stolowitz |
| 8,074,149 | B2 | 12/2011 | Stolowitz |
| 2002/0066050 | A1 | 5/2002 | Lerman et al. |
| 2003/0066010 | A1 | 4/2003 | Acton |
| 2003/0200478 | A1 | 10/2003 | Anderson |
| 2004/0205269 | A1 | 10/2004 | Stolowitz |
| 2005/0223269 | A1 | 10/2005 | Stolowitz |
| 2010/0251073 | A1 | 9/2010 | Stolowitz |
| 2010/0257401 | A1 | 10/2010 | Stolowitz |

FOREIGN PATENT DOCUMENTS

EP          0578139 A2       1/1994

OTHER PUBLICATIONS

Tala, Deepak Kumar. Gate Level Modeling Part-II. [online] Oct. 20, 2001, [retrieved on Jun. 21, 2007]. Retrieved from the Internet <URL: http://web.archive.org/web/20040417053300/http://www.asic-world.com/verilog/gate2.html>.*

Office Communication from European Application No. 04760132.3-1245 mailed on Jun. 11, 2007.

Preliminaiy Report from PCT Application No. PCT/US2004/012476 mailed on Nov. 3, 2005.

European Office Action from application No. 04 760 132.3-1245 dated Jan. 30, 2009.

Office Action from Canadian Patent Application No. 2,522,915, dated Dec. 15, 2010.

Notice of Allowance from U.S. Appl. No. 12/649,228, dated Jul. 22, 2011.

Final Office Action from U.S. Appl. No. 10/822,115, dated Mar. 26, 2007.

Non-Final Office Action from U.S. Appl. No. 10/822,115, dated Jul. 13, 2006.

Examiner's Answer from U.S. Appl. No. 10/822,115, dated May 14, 2008.

Non-Final Office Action from U.S. Appl. No. 10/822,115, dated Aug. 31, 2010.

Decision on Appeal from U.S. Appl. No. 10/822,115, dated Dec. 21, 2009.

"SATA PHY Interface Specification (SAPIS)," Draft—Rev. 0.90, Intel Corporation, Feb. 8, 2002, pp. 1-12.

Non-Final Office Action from U.S. Appl. No. 11/080,376, dated Aug. 22, 2007.

Non-Final Office Action from U.S. Appl. No. 11/080,376, dated Feb. 25, 2008.

Non-Final Office Action from U.S. Appl. No. 11/080,376, dated Mar. 16, 2009.

Non-Final Office Action from U.S. Appl. No. 11/080,376, dated Sep. 11, 2009.

Notice of Allowance from U.S. Appl. No. 11/080,376, dated Apr. 1, 2010.

Supplemental Notice of Allowability from U.S. Appl. No. 11/080,376, dated Feb. 17, 2011.

Non-Final Office Action from U.S. Appl. No. 12/649,229, dated Oct. 28, 2010.

Notice of Allowance from U.S. Appl. No. 12/649,229, dated Aug. 2, 2011.

International Search Report and Written Opinion from International Application No. PCT/US2004/011021, dated Apr. 20, 2005.

Office Action from Taiwan Patent Application No. 093109754, dated Feb. 10, 2009.

Office Action from Taiwan Patent Application No. 093109754, dated Sep. 17, 2008 (Translation Only).

Office Action from Canadian Patent Application No. 2,522,915, dated Aug. 21, 2007.

Notification to Grant from Chinese Patent Application No. 200480010686.7, dated Oct. 26, 2007.

Office Action from Chinese Patent Application No. 200480010686.7, dated Nov. 10, 2006 (Translation Only).

International Search Report from International Application No. PCT/US2004/012476, dated Jun. 2, 2005.

Notice of Allowance from Taiwan Patent Application No. 093111121, dated Jan. 23, 2007.

Office Action from Taiwan Patent Application No. 093111121, dated Jul. 26, 2006.

International Search Report and Written Opinion from International Application No. PCT/US05/08647, dated Jan. 3, 2008.

EDN Access; for Design, by Design: "Embedded Systems," Jan. 18, 1996, published on the Internet by EDN Magazine at http://www.e-insite.net/ednmag/archives/1996/011896/02prod4.htm.

EDN Access; for Design by Design, "Easy-to-Use Flash-Memory Modules Emulate Disk Drives," Sep. 1, 1994, by Gary Legg. Published on the Internet by EDN Magazine at http://www.e-insite.net/ednmag archives/1994/090194/182df2.htm.

Silicon Valley Computer advertisement dated Jan. 21, 1994, by Norm Towson.

"Silicon Valley Computer, IDE Mirror Card, Model ADP104/ADP108," User Manual, Part No. 113, Copyright 1992 by Silicon Valley Computer. (Cover page, table of contents, introduction, and pp. 8-16.).

Sven Schulz, "Elegant Pair Skating," Promise FastTrak, EIDE RAID Adapter, C'T Magazin Fur Computer Technik, Jun. 1998, p. 116.

Jin et al., "Improving Partial Stripe Write Performance in RAID Level 5," Proceedings of the 1998 Second IEEE International Caracas Conference on Devices, Circuits and Systems, 1998, pp. 396-400.

Sahai, Anil K., "Performance Aspects of RAID Architectures," Performance, Computing and Communications Conference, 1997, IPCCC 1997, IEEE International, pp. 321-327.

Zabback et al., "The RAID Configuration Tool," Third International Conference on High Performance Computing, 1996, pp. 55-61.

Cheng et al., "Improving the I/O Performance of Real-Time Database Systems with Multiple-Disk Storage Structures," Proceedings of the 1996 International Conference on Parallel Processing, 1996, vol. 3, pp. 204-211.

Feng et al., "Performance Analysis of RAID for Different Communication Mechanism Between RAID Controller and String Controllers," IEEE Transactions on Magnetics, vol. 32, No. 5, Sep. 1996, pp. 3890-3892.

Menon et al., "The Architecture of a Fault-Tolerant Cached RAID Controller," Proceedings of the 20th Annual International Symposium on Computer Architecture, 1993, pp. 76-86.

"PCI IDE Controller Specification," Revision 1.0, Mar. 4, 1994, pp. 1-5.

Hosler, B., "Programming Interface for Bus Master IDE Controller" Revision 1.0, May 16, 1994, Intel Corporation, pp. 1-6.

* cited by examiner

Mapping Register

| r | PP_L4 | PP_L3 | PP_L2 | PP_L1 | PP_L0 |

24

Mapping Register Description

| BITS | FIELD | CONTENTS |
|---|---|---|
| 2:0 | Logical Port 0 | # of connected physical port |
| 5:3 | Logical Port 1 | # of connected physical port |
| 8:6 | Logical Port 2 | # of connected physical port |
| 11:9 | Logical Port 3 | # of connected physical port |
| 14:12 | Logical Port 4 | # of connected physical port |
| 15 | Reserved | 0 |

DISK ARRAY CONTROLLER WITH RECONFIGURABLE DATA PATH

RELATED APPLICATIONS

This is a continuation of and claims priority from U.S. Provisional Application No. 60/464,892 filed Apr. 21, 2003. Said provisional application is incorporated herein by this reference.

COPYRIGHT NOTICE

© 2003-2004 Netcell Corporation. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to digital data storage systems and, more specifically, pertains to improvements in disk array controller technology for digital data storage and retrieval.

BRIEF DESCRIPTION OF THE DRAWINGS

FIG. 4 is one example of a Mapping Register structure; the Mapping Register controls the configuration of the data paths between the logical and physical data ports in one embodiment of the array controller.

DETAILED DESCRIPTION OF PREFERRED EMBODIMENTS

Mapping Register

Figure 1:
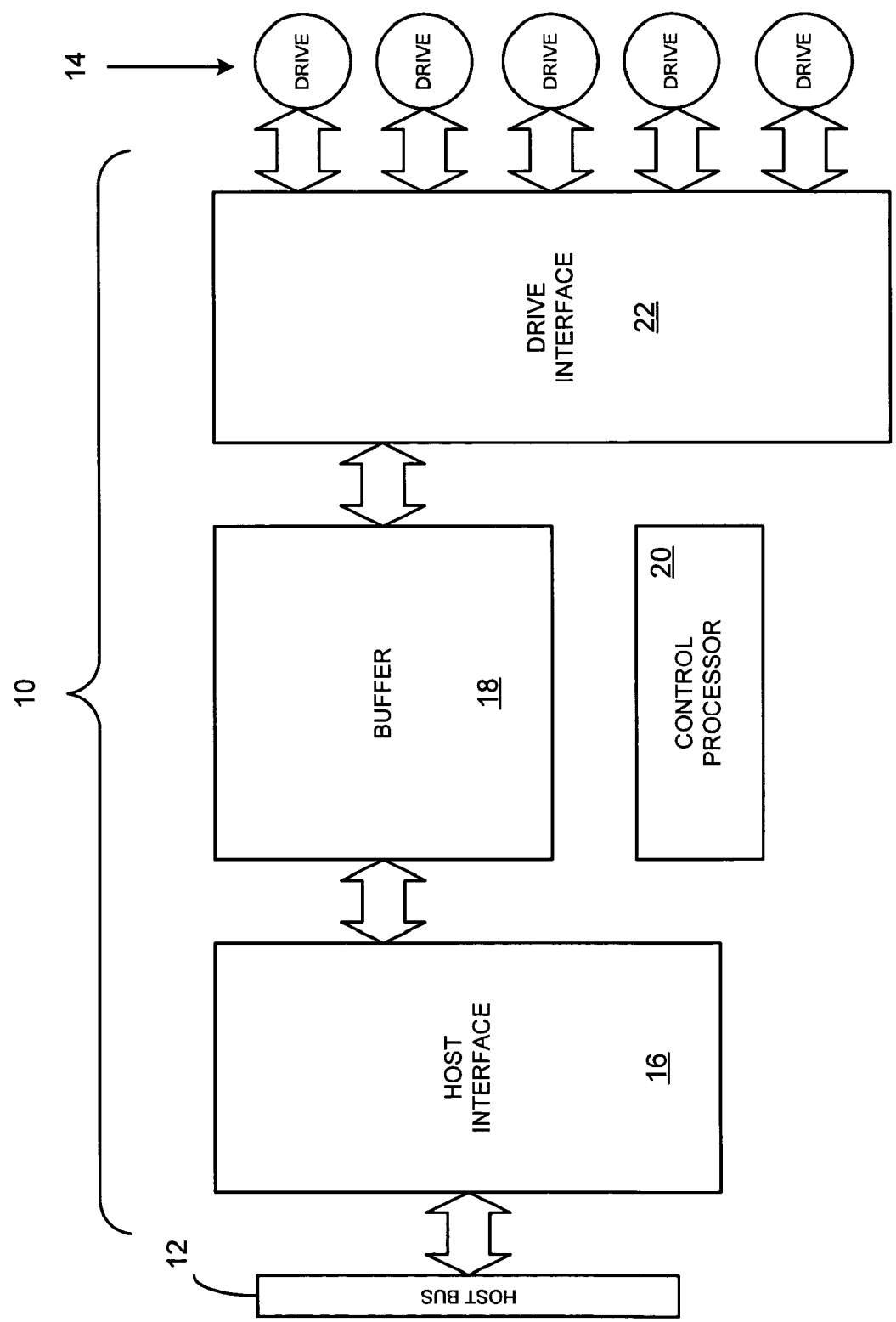
FIG. 1 is a simplified block diagram of a disk array controller providing a host interface for interaction with a host bus, and a drive interface for interaction with a plurality of attached disk drives.

The typical RAID controller for a small computer system includes an interface to a host system and an interface to a drive array. FIG. 1 is a simplified block diagram of a disk array controller 10 providing a host interface 16 for interaction with a host bus 12, and a drive interface 22 for interaction with a plurality of attached disk drives 14. The controller preferably includes a control processor 20 and a buffer memory 18 for temporary storage of data moving between the host bus and the drives.

Figure 2A:
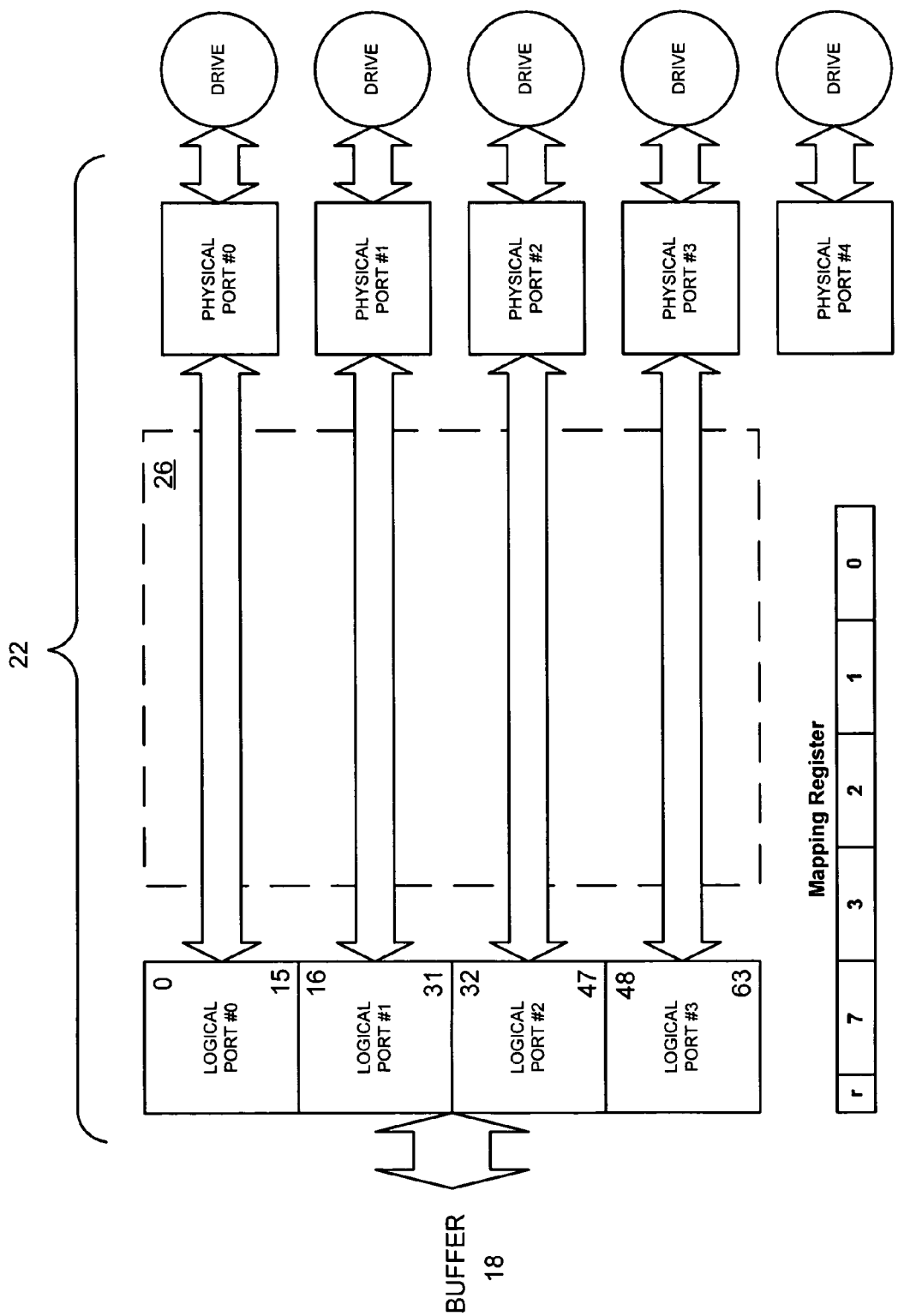
FIG. 2A is a conceptual diagram illustrating direct connections between logical data ports and physical data ports; and it shows corresponding Mapping Register contents.

A physical port is required for the attachment of a mass storage device such as a disk drive to a system. While some interfaces are capable of supporting concurrent data transfers to multiple devices, the physical ports tend to become a bottleneck. For this reason, a high performance RAID controller may have a physical port per mass storage device as shown in FIG. 2A. FIG. 2A also shows the corresponding contents of a Mapping Register 24, further described below with reference to FIG. 4.

One of the performance benefits of RAID comes from the striping of data across the drives of the array. For example, reading data from four drives at once yields a four times improvement over the transfer rate of a single drive. For the example shown in FIG. 2A, the sixteen bit data arriving from four drives is merged in logical drive order into sixty-four bit data that is sent to the buffer (18 in FIG. 1). User data was striped, ie. it was distributed a segment at a time (e.g. 16-bit word) across an array of drives in a predetermined sequence. We identify that sequence as starting with Logical Drive #0 and proceeding through Logical Drive #n−1, where n is the number of drives in the array. This stripe sequence is repeated so that the kth segment of the user data corresponds to logical drive (K mod n). In this way, we use the logical drive numbering to reflect the striping order. Accordingly, in the drawing, the stack of four "Logical Ports" simply indicates an ordered set of four segments of a stripe. Each "Logical Port" corresponds to a single segment of the stripe, and the whole stack corresponds to an ordered set of four segments.

The 100 MBPS transfer rate from each of the drives becomes a 400 MBPS transfer rate to the buffer. Dashed box 26 conceptually represents a data path switch described later in detail. The data path switch 26 provides dynamically configurable data paths between logical data ports and physical data ports.

Figure 2B:
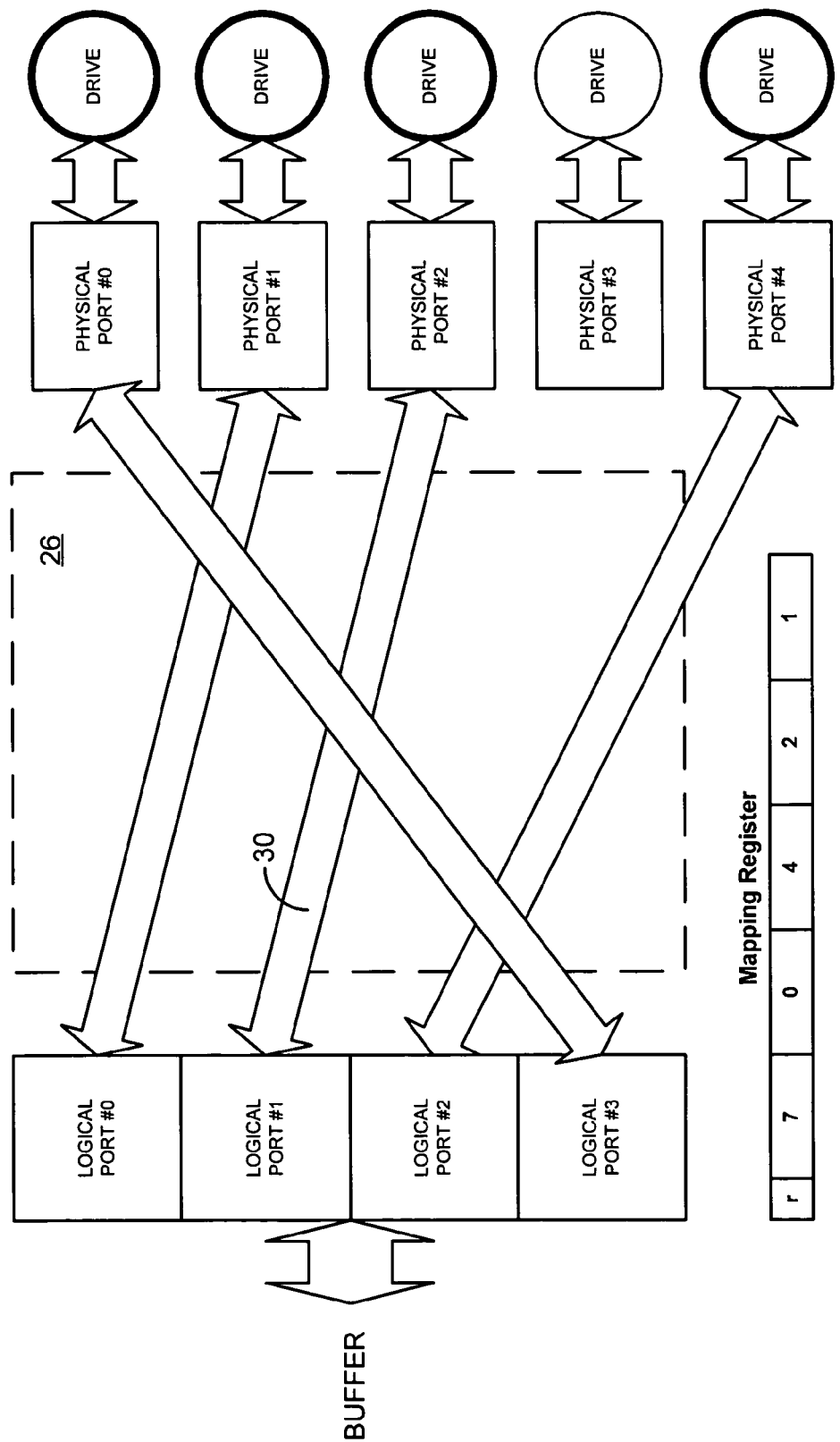
FIG. 2B is a conceptual diagram illustrating one example of assignments of four logical ports to the available five physical data ports; and it shows corresponding Mapping Register contents.

FIG. 2A, with its direct connection between logical data ports and physical data ports, is only a conceptual diagram. In real applications, the number of available physical data ports will be greater than the number of logical data ports. There may be ports that are reserved as "hot spares" or the physical ports may be grouped into different sub-arrays that are accessed independently. FIG. 2B is an example of one of the possible assignments of four logical data ports (Logical Port #0 to Logical Port #3) to the available five physical data ports, Physical Port #0 to Physical Port #4). For example, the large arrow 30 simply indicates the assignment of Logical Port #1 to Physical Port #2. FIG. 2B also shows the corresponding contents of a Mapping Register 24. Here, the second field from the right in the register corresponds to Logical Port #1, and it contains the value "2" indicating the Physical Port #2, as indicated by arrow 30. The data path switch 26 implements logical to physical port assignments as fully described later.

Figure 2C:
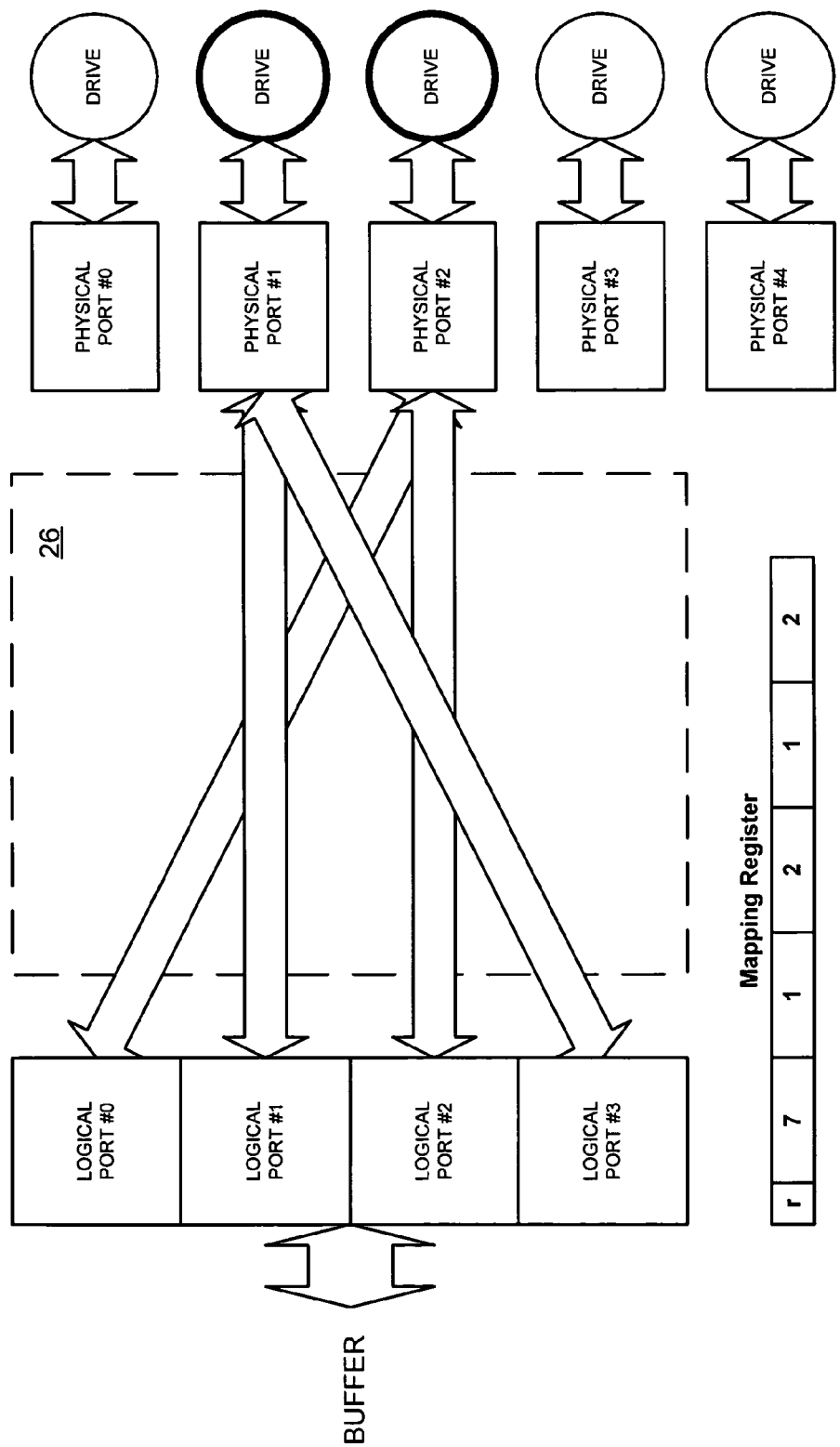
FIG. 2C is a conceptual diagram illustrating a two-drive array where each of the drives is assigned to one of the five available physical data ports; and it shows corresponding Mapping Register contents.

FIG. 2C shows an example of a two-drive array where each of the drives is assigned to one of the five available physical ports, namely Physical Port #1 and Physical Port #2. In order to assemble a 64-bit word for the buffer, each of the 16-bit drives must be read twice. On the first read, the data for Logical Ports #0 and #1 are obtained from Physical Ports #2 and #1, respectively. On the second read, Logical Ports #2 and #3 obtain data from Physical Ports #2 and #1 respectively. These operations are orchestrated by the processor 20. Again, the Mapping Register shows the assignments to Physical Ports #1 and #2.

Figure 2D:
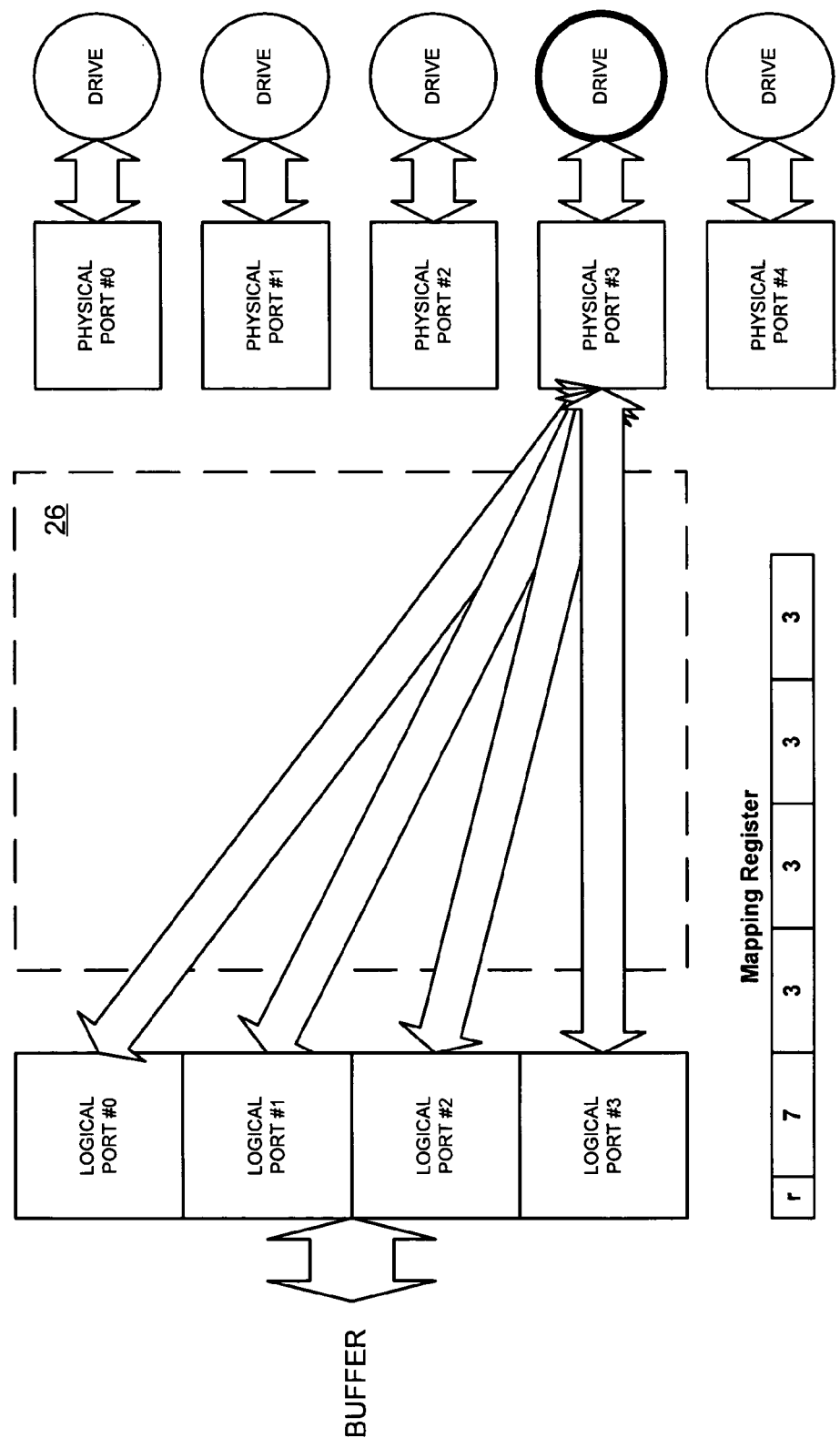
FIG. 2D is a conceptual diagram illustrating a single-drive system where logical ports 0-3 transfer data on successive cycles to physical port #3; and it shows corresponding Mapping Register contents.

FIG. 2D shows an example of an array with a single drive connected to physical port #3. For this configuration, the data for logical ports #0 through #3 is obtained by reading the same physical port four times.

Figure 3A:
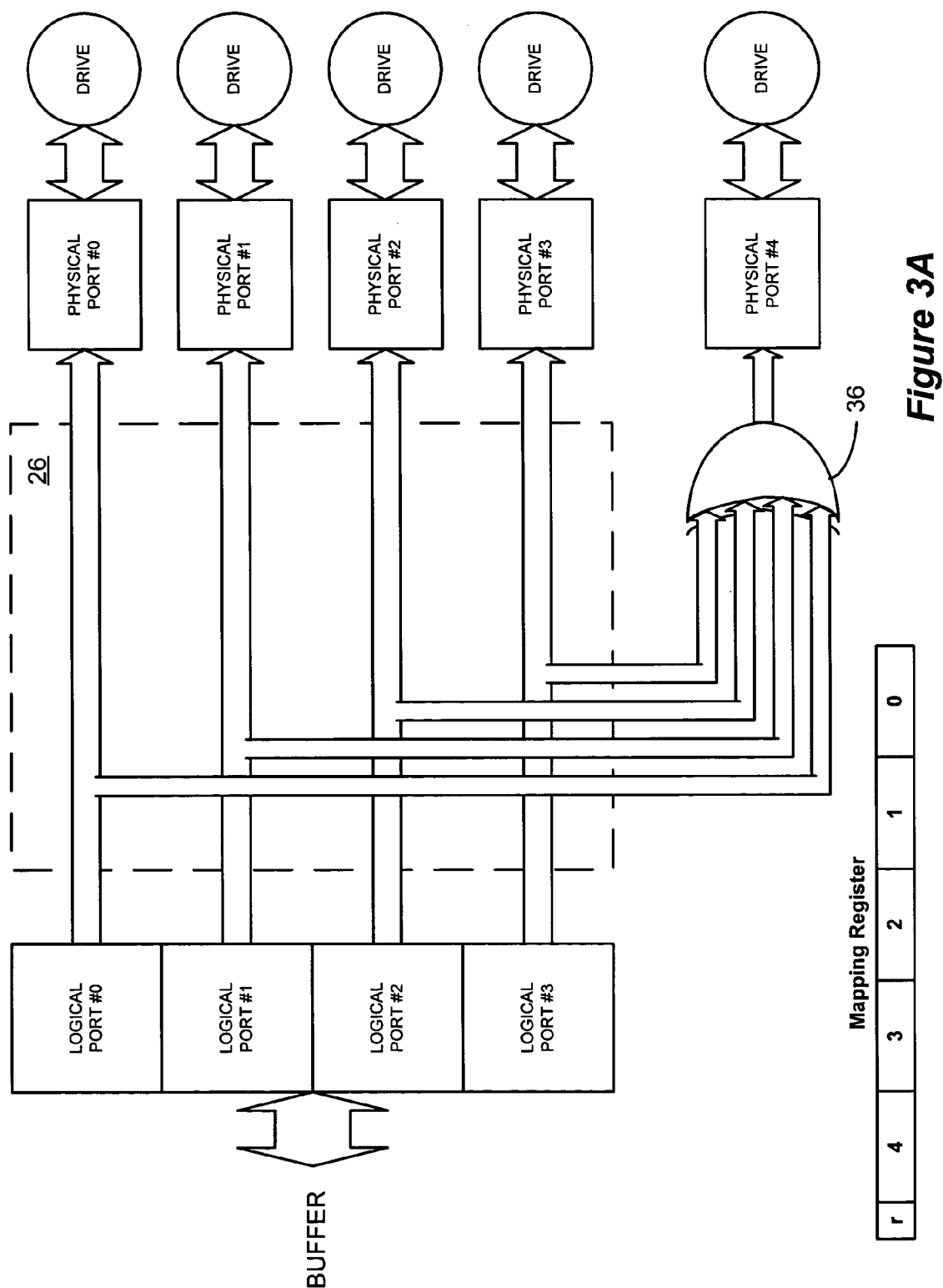
FIG. 3A illustrates XOR logic in the disk write direction in the drive configuration of FIG. 2A; and it shows corresponding Mapping Register contents.

One of the features of the Synchronous Redundant Data Transfers described in U.S. Pat. No. 6,018,778 is that it allows redundant data to be processed "On-The-Fly" as described in U.S. Pat. No. 6,237,052. FIG. 3A shows the four-drive array of FIG. 2A with the addition of logic 36 to compute a redundant data pattern that is stored on the drive attached to physical port #4. While various arithmetic and logical operations might be used to produce a redundant pattern, the logical XOR between the corresponding bits of the data from the logical data ports has the advantage over an arithmetic operation in that the XOR operation does not have to propagate a carry. Due to the use of the XOR, the fifth drive is often referred to as either the "redundant" drive or the "parity" drive.

Figure 3B:
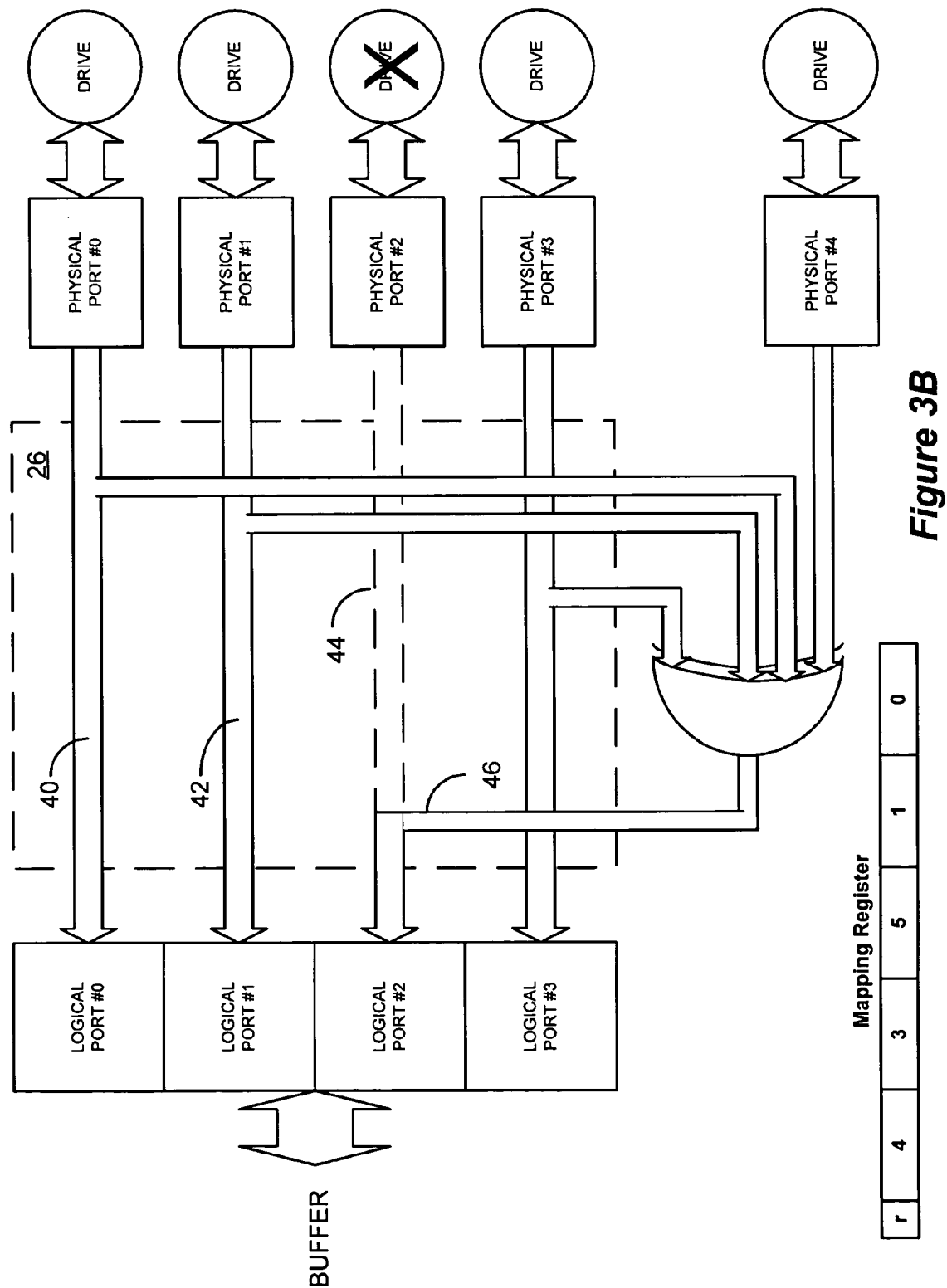
FIG. 3B illustrates the XOR logic in the Disk Read direction for the same data path as FIGS. 2A and 3A except that the drive attached to physical port 2 has now failed; and again the Mapping Register contents are shown.

The 16-bit wide Bus XOR shown in the figure is equivalent to sixteen XOR gates, each with four inputs. The use of the XOR function is also very symmetrical between the disk read and disk write operations as can be seen in FIG. 3B. FIG. 3B shows the same four-drive array as defined in FIG. 3B, with the data paths 40, 42 etc. shown for the disk read direction. In this case, the drive attached to physical port #2 has failed. Accordingly, the corresponding data path 44, which does not function, is shown in dashed lines. The XOR function is computed across the data from the remaining data drives (Physical Ports #0, #1 and #3) and from the redundant drive, Physical Port #4. This computation reconstructs the data that was stored on the failed drive and the result is directed to logical port #2 via data path 46 in place of the now unavailable data from the failed drive.

The preceding paragraphs demonstrate some examples of the various relationships that might exist between a set of logical ports and a set of physical device ports in a RAID Controller. In general, a high performance RAID controller is forced to deal with multiple arrays made up of various subgroups of the mass storage devices connected to its physical ports. One aspect of the present invention employs a novel mapping register and associated logic to enable software configuration of storage device arrays, and improve performance as further explained below.

In accordance with one embodiment of the invention, a Mapping Register 24, the structure of which is shown in FIG. 4, controls the configuration of the data paths between the logical and physical data ports. (The Mapping Register also provides other features and advantages discussed later.) In this embodiment, the Mapping Register consists of five fields, one for each of five logical data ports, L0-L4 in this example. Each logical data port's corresponding field in the register is loaded with the number of the physical data port to which it is connected. The data in the field for logical data port 0, is represented symbolically as PP_L0 indicating that it is the Physical Port associated with Logical Port 0. The values in the next four fields are identified as PP_L1, PP_L2, PP_L3, and PP_L4 respectively. The fifth logical data port is a pseudo port. The PP_L4 value is used to assign a physical data port for the Parity drive.

The Mapping Register fields can be of almost any size. An eight-bit field, for example, would support an array of up to 256 physical ports. In the illustrative embodiment, with only five physical ports, a three bit field is sufficient. The five fields pack nicely into a sixteen bit register with a bit to spare noted by an "r" in the Figures for "reserved". Any type of non-volatile memory can be used to store the mapping register information.

To demonstrate the use of the Mapping Register, we will briefly revisit each of the configurations described so far. In FIG. 2A, note that a Mapping Register 24 is shown. The value of PP_L0 is 0 indicating the logical data port #0 is connected to physical port #0. The next three values are 1, 2, and 3 indicating that the next three logical data ports are connected to the next three physical data ports. The value of PP_L4 is 7. This is not a legal physical port number in this example. The value "7" is used to indicate that there is no parity drive in this configuration. The specific value chosen is not critical, as long as it is not an actual physical port number.

Referring again to FIG. 2B, the values stored in the Mapping Register indicate that physical data ports 1, 2, 4, and 0 support the logical ports 0 through 3 respectively. Once again, the "7" indicates that a parity drive is not used.

FIG. 2C shows the Mapping Register configured for a two-drive array. Note that logical data ports #2 and #3 are associated with the same physical ports as logical ports #0 and #1. The first two logical ports transfer data on the first physical port cycle while the second two logical ports transfer data on the second physical port cycle.

FIG. 2D shows the Mapping Register configured for the single drive case. Logical ports #0 through #3 transfer data on successive cycles to physical port #3. All of the variations of FIG. 2 are different data path configurations shown independent of the redundant data logic.

FIG. 3A shows the XOR logic in the Disk Write direction for the same data drive configuration as FIG. 2A. The XOR is computed over the data from all four of the logical data ports. The result is stored on the drive attached to the physical port specified in logical port #4 field of the Mapping Register. In this example, PP_L4 has a value of "4" instead of "7" indicating that there is a parity drive and that it is attached to port #4.

FIG. 3B shows the XOR logic in the Disk Read direction for the same data path as FIGS. 2A and 3A, except that the drive attached to physical port #2 has now failed. The contents of the Logical Data Port 2 field, PP_L2, has been replaced with a "5". The legal physical port numbers are 0 through 4. The "5" is a reserved value used to indicate that a drive has failed. Any logical data port accessing the pseudo physical port number 5 will take its data from the output of the XOR.

Data Path Switch

In the preceding discussion, we have demonstrated that four values loaded into the fields of a Mapping Register may be used to represent all of the possible configurations between four logical data ports, and 1, 2, or 4 drive arrays attached to five physical ports, with or without a redundant drive; and for the arrays with redundant drives, with or without a failed drive. The following will describe how the contents of the Mapping Register is used to configure the hardware blocks and the data paths. The following discussion, in other words, presents the details of a presently preferred implementation of the data path switch 26, and how it is configured by the mapping register contents.

Figure 5A:
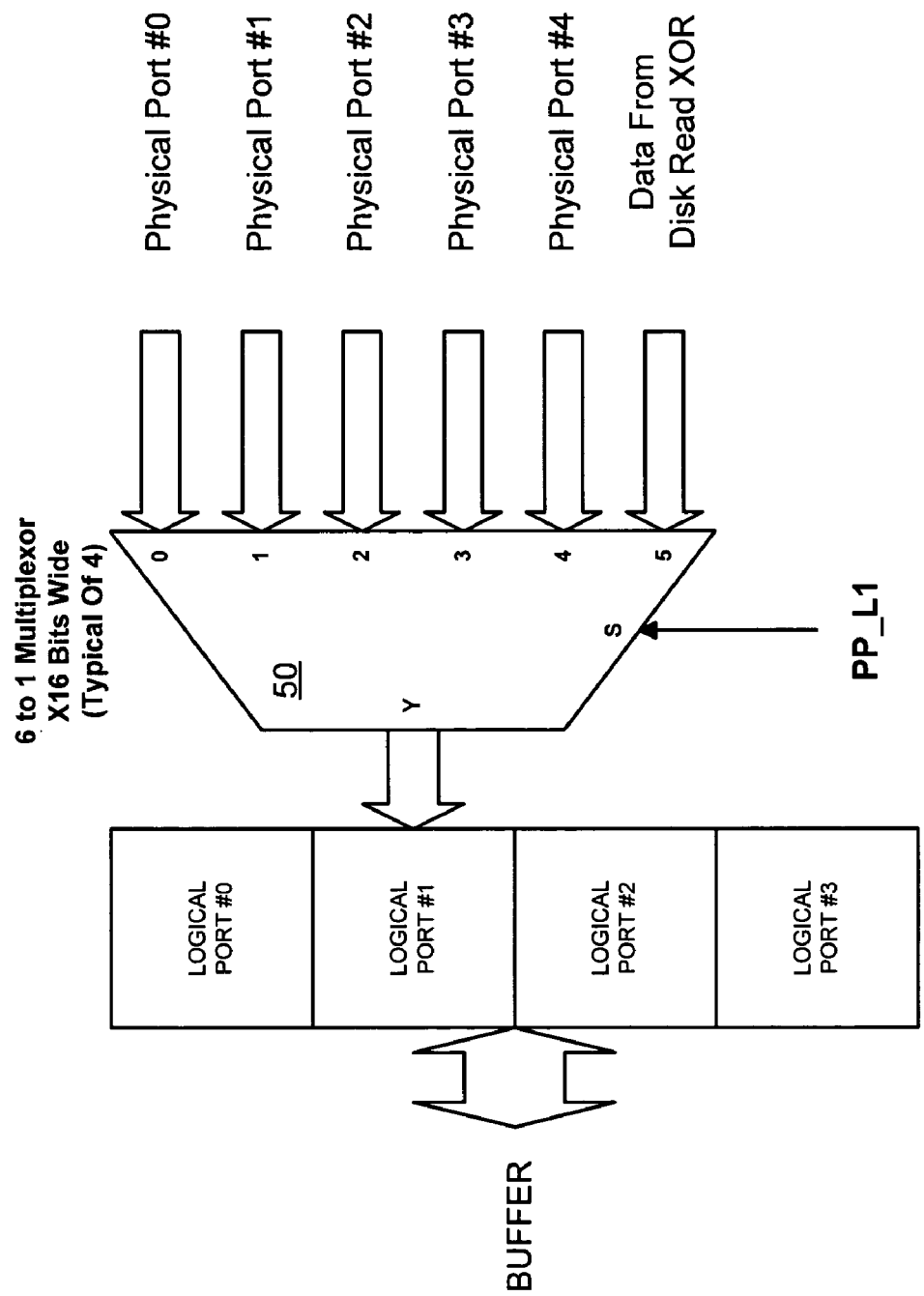
FIG. 5A is a conceptual diagram of multiplexer circuitry in the logical port #1 read data path.

Referring now to FIG. 5A, each of the four logical data ports must be able to receive data from any of the five physical data ports or, in the case of a failed drive, from the Disk Read XOR. With the six possible data sources, each of the physical data ports has a corresponding six-to-one multiplexor 50, sixteen bits wide. The multiplexor 50 for logical port 1 is shown in the FIG. 5A, but the others (for Logical Ports #0, #2 and #3) are identical. The selector or "S" input of the multiplexor is connected to Logical Port #1 field of the Mapping Register—"PP_L1". The PP_L1 values of 0 through 4 select data from physical ports #0 through #4 respectively while a the value "5" selects the output of the Disk Read XOR.

Figure 5B:
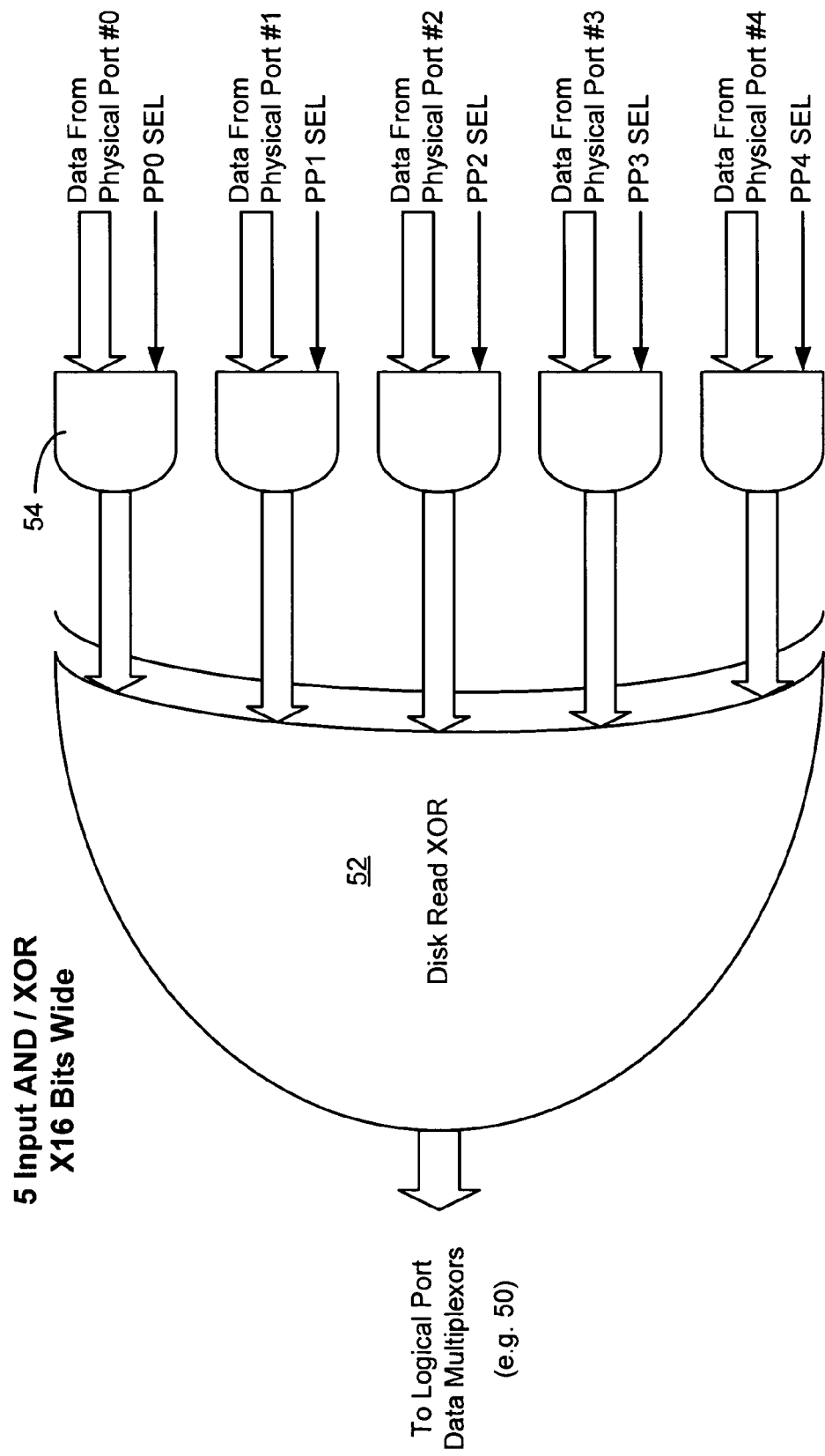
FIG. 5B illustrates disk read XOR logic in one embodiment of the array controller.

FIG. 5B shows the Disk Read XOR logic 52. The Disk Read XOR 52 is a five-input XOR circuit, sixteen bits wide in the preferred embodiment (corresponding to the attached disk drive data paths). (This is equivalent to sixteen XORs, each with five inputs.) Each of the five inputs is logically qualified or "gated" by a corresponding AND gate, also sixteen bits wide, for example AND gate 54. (This is equivalent to sixteen NAND gates, each with two inputs.) The five NAND gates are qualified by the corresponding five physical port select signals, PP0_SEL through PP4_SEL. The generation of these signals will be described below.

Figure 6:
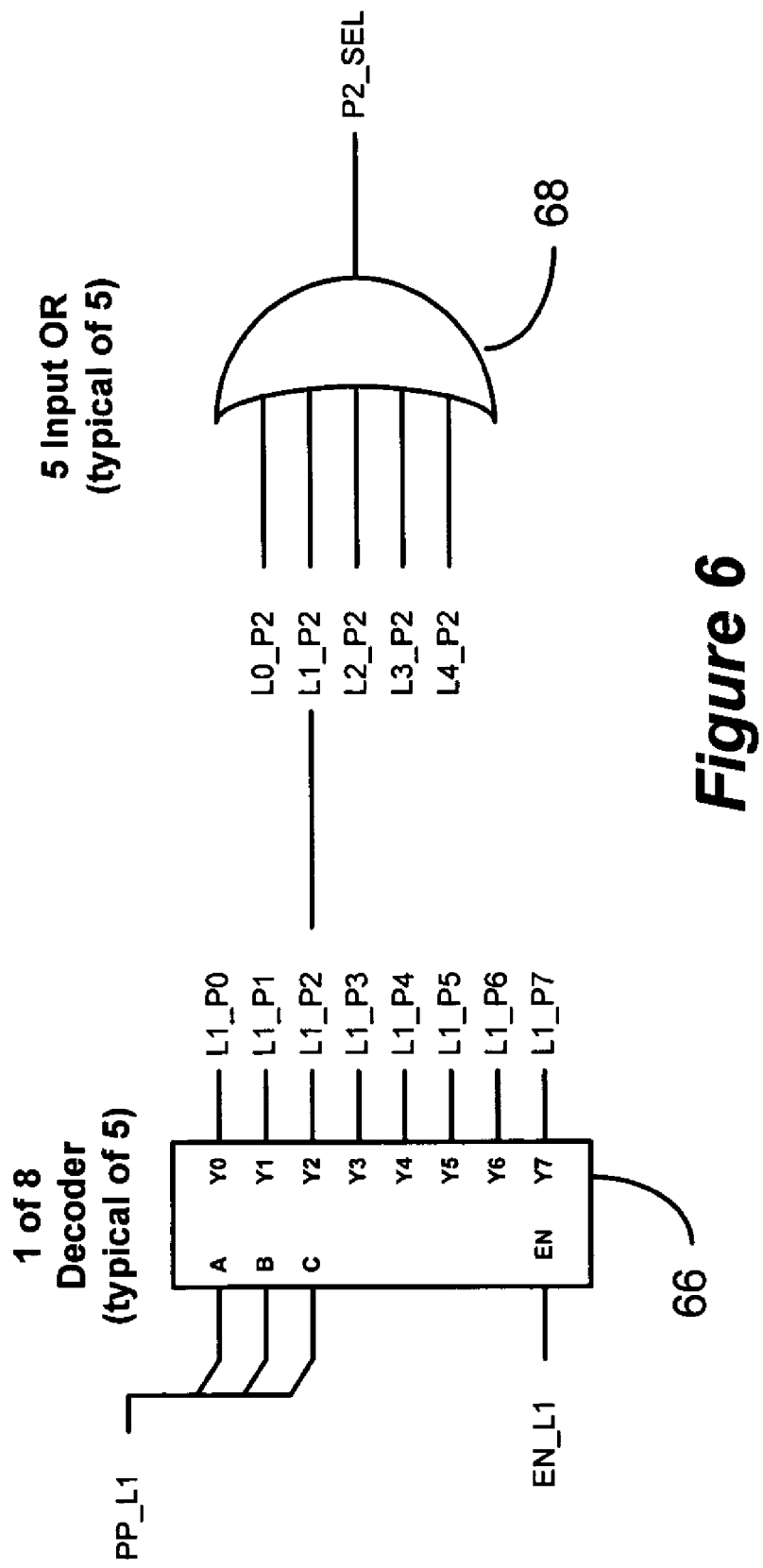
FIG. 6 illustrates decoder logic for the Logical Port #1 (PP_L1) field of the Mapping Register in one embodiment of the array controller.

The data path to each of the physical ports may come from any of the four logical data ports, or from the Disk Write XOR. Examples were shown with reference to FIGS. 2A-2D. While a field of the Mapping Register identifies the data source for each of the logical data ports, we do not have a field that provides the corresponding data for each of the physical ports. This information can be derived from the fields that we do have. Each of the three bit binary encoded fields of the Mapping register is decoded with a "one of eight" decoder. FIG. 6 shows such a decoder 66 for the Logical Port #1 field. The value PP_L1 is decoded into L1_P0, L1_P1, L1_P2 . . . L1_P7 where the names indicate a path from a source to a destination. L1_P2, for example, indicates a path from Logical Port #1 to Physical Port #2.

Figure 7A:
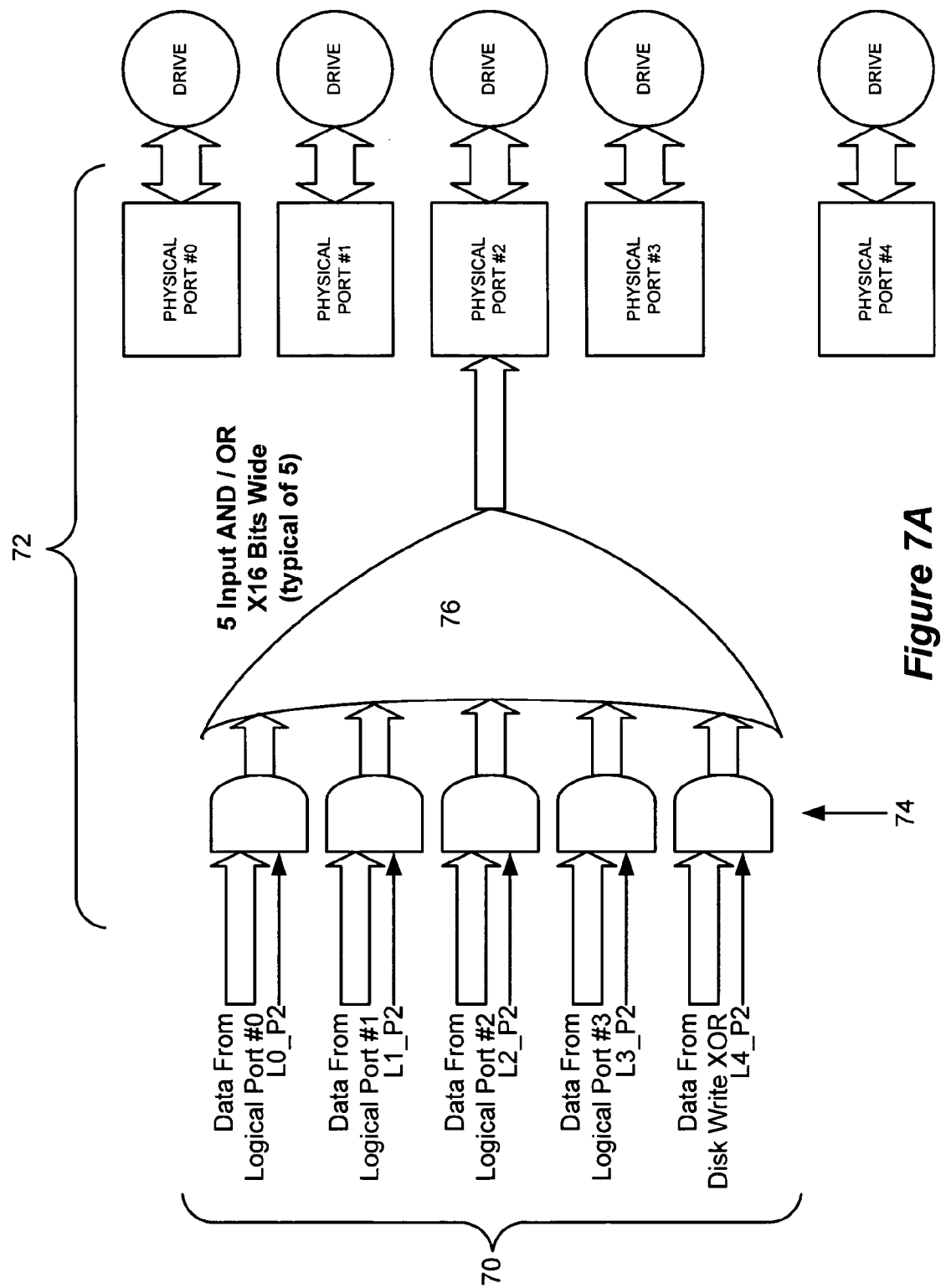
FIG. 7A logical port to physical port data path logic in one embodiment of the array controller (illustrated for physical port #2 only).
Figure 7B:
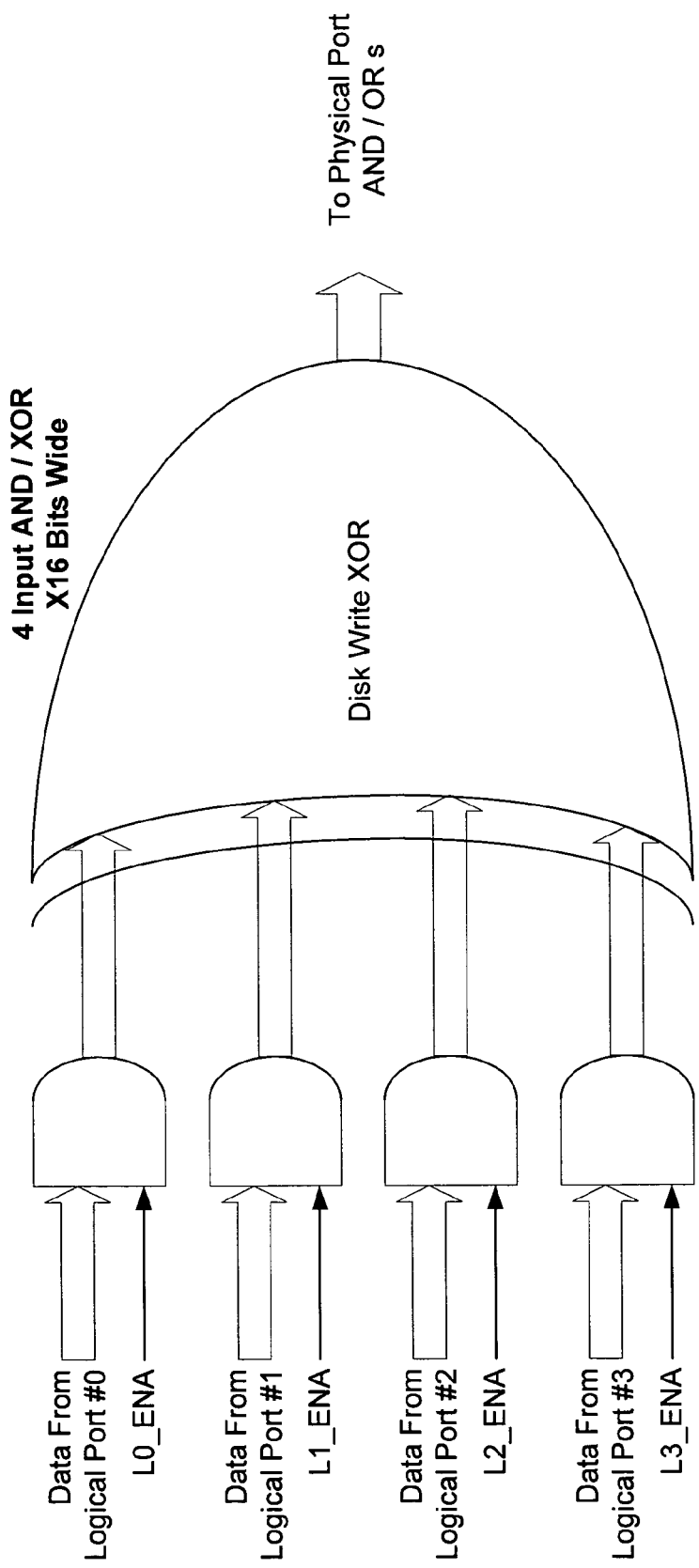
FIG. 7B illustrates disk write XOR logic in one embodiment of the array controller.

Referring now to FIG. 7A, sample circuitry is shown for multiplexing of the data paths 70 from the logical data ports to the physical data ports (#0-#4). The multiplexor 72 for physical port #2 is shown in the figure, but the multiplexors for the other four ports (not shown) are identical. Each of the multiplexors 72 consists of an AND/OR array with five AND gates 74, all sixteen bits wide, and a corresponding OR gate 76. (Each of the AND gates is equivalent of sixteen AND gates, each with two inputs. The OR gates is equivalent to sixteen OR gates, each with five inputs.) For the physical port #2 multiplexor, the AND gates from the logical data ports are qualified by the corresponding outputs of the five decoders, i.e. L0_P2, L1_P2, L2_P2, L3_P2, and L4_P2 as shown.

At this point, there are two open issues to resolve. In a two-drive array, a given physical port received data from two different logical ports, though on different cycles. Referring back to FIG. 6, each of the decoders 66 has an enable input "EN" that qualifies all of its outputs. For the two-drive configuration, only the decoders for logical data ports #0 and #1 are enabled on a first cycle, and only the decoders for logical data ports #2 and #3 are enabled on a second cycle. For this reason, only one of the AND gates in FIG. 7A will be qualified at a time. In other words, only the data from the assigned logical port (according to the mapping register) is input to the corresponding physical port.

In a single-drive array where a single physical port receives data from all four logical ports (See FIG. 2D), only one decoder 66 is enabled at a time so that only one AND gate 74 will be enabled at a time selecting a unique data source (Logical Port). The other open issue was the source for the "PPn_SEL" signals of FIG. 5B. FIG. 6 show the use of a five-input OR gate 68 that will assert the PPn_SEL signal for a physical port "n" if there is a data path between the subject physical port and any of the logical ports. This provides an indication that the physical port is active and may participate in the Disk Read XOR in FIG. 5B.

Global Read & Writes

In accordance with the ATA/ATAPI specifications, sending commands to the drives requires the use of Programmed IO or PIO mode that may be as slow as 600 nS per access for devices that support only PIO Mode 0 and no better than 120 nS per access for devices supporting Mode 4. A single command requires eight or more accesses. If all of the drives have to be commanded sequentially, this time is multiplied by the number of drives and adds considerable latency to the entire process. The commands could be issued concurrently by an independent controller per port, but this adds considerably to the complexity and cost.

When data is striped over an array of drives, portions of a given stripe will be located at the same relative position on each of the drives. This makes the address of the data, the Logical Buffer Address or LBA, the same for each of the drives. As a result, the commands to read a given stripe are identical for all of the drives of the array. And the commands to write a given stripe would be identical as well. This makes it possible for the local processor (e.g. 20 in FIG. 1) to "broadcast" common commands in no more time than would otherwise be required to send a command to a single drive.

Figure 8:
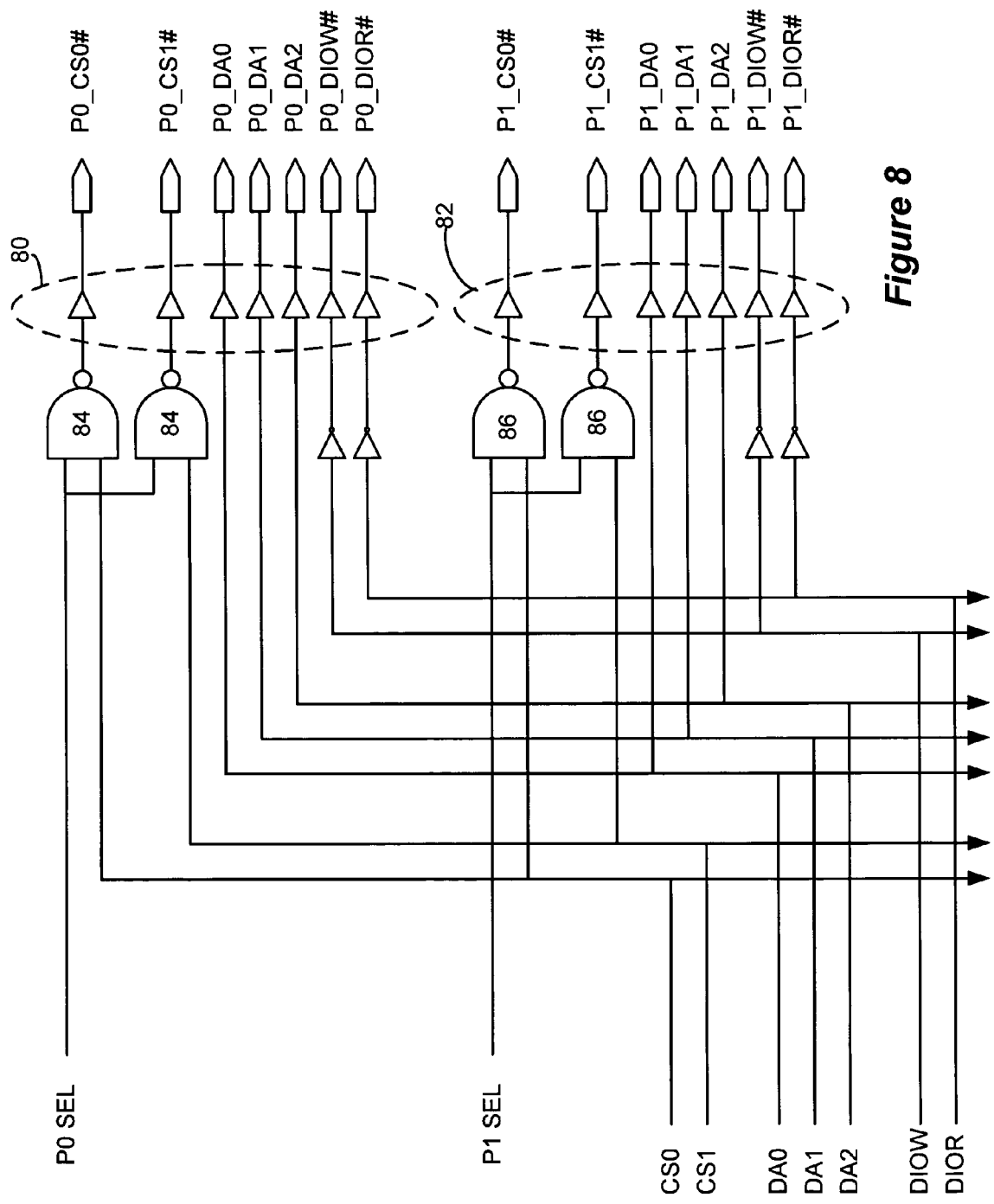
FIG. 8 illustrates disk address, strobe and chip select logic to enable global access commands to a currently selected array.

As noted earlier, a drive array may consist of a subset of the attached drives. (One of the advantages of the present invention is the ability to easily configure, or reconfigure, the organization of attached drives into defined arrays simply by storing appropriate configuration bytes into the mapping register.) In the case where an array consists of a subset of the attached drives, commands (such as read and write) may only be "broadcast" to the selected subset. Either the drives must be commanded one at a time, or some means must be provided to "mask" the physical data ports not participating in the current array. FIG. 8 shows one implementation to address this issue.

Referring to FIG. 8, the address, strobe, and chip select signals CS0, CS1, DA0, DA1, DA2, DIOW and DIOR are shown for the first two of the five physical ports (P0 and P1). Note that these address and strobe signals are common to all five ports. They are buffered individually so that a failure of a given drive cannot block the propagation of these signals to the other drives. See buffers 80,82. The output drivers for the two chip select signals CS0#, CS1# of a given port are qualified by the Pn_SEL signal for that port; see gates 84, 86. Any port not selected by the current contents of the Mapping Register will not have either of its chip selects asserted and therefore will ignore the read and write strobes.

It may seem that a "global read" does not make any sense as it implies that potentially conflicting data values are returned on a common bus. In the current embodiment, a "global read" causes a read strobe, FIG. 8 Pn_DIOR#, to be "broadcast" to all of the physical data ports. Those attached storage devices qualified by a chip select (Pn_CS0#, Pn_CS1#) will return data to the physical port where it is latched at the trailing edge of the Pn_DIOR# strobe. No attempt is made to return a data value to the local processor as a result of this read cycle.

The local processor will then read each of the ports one at a time using a different address which does not cause a repeat of the Pn_DIOR# strobe cycle and without changing any of the latched data. These cycles do allow the local processor to fetch the potentially unique values stored in each of the data latches. The Pn_DIOR# cycle which may require up to 600 nS is only executed once. The values latched in each of the ports may be fetched in 15 ns each for a significant time savings over repeating the Pn_DIOR# cycle five times.

The "global read" and "global write" apparatus allows the local processor to send commands to and receive control status from the currently selected array in the minimum possible amount of time. When a different sub-array is selected by loading a new value in the Mapping Register, the control interface updates automatically without other code changes.

Status Ordering

Figure 9:
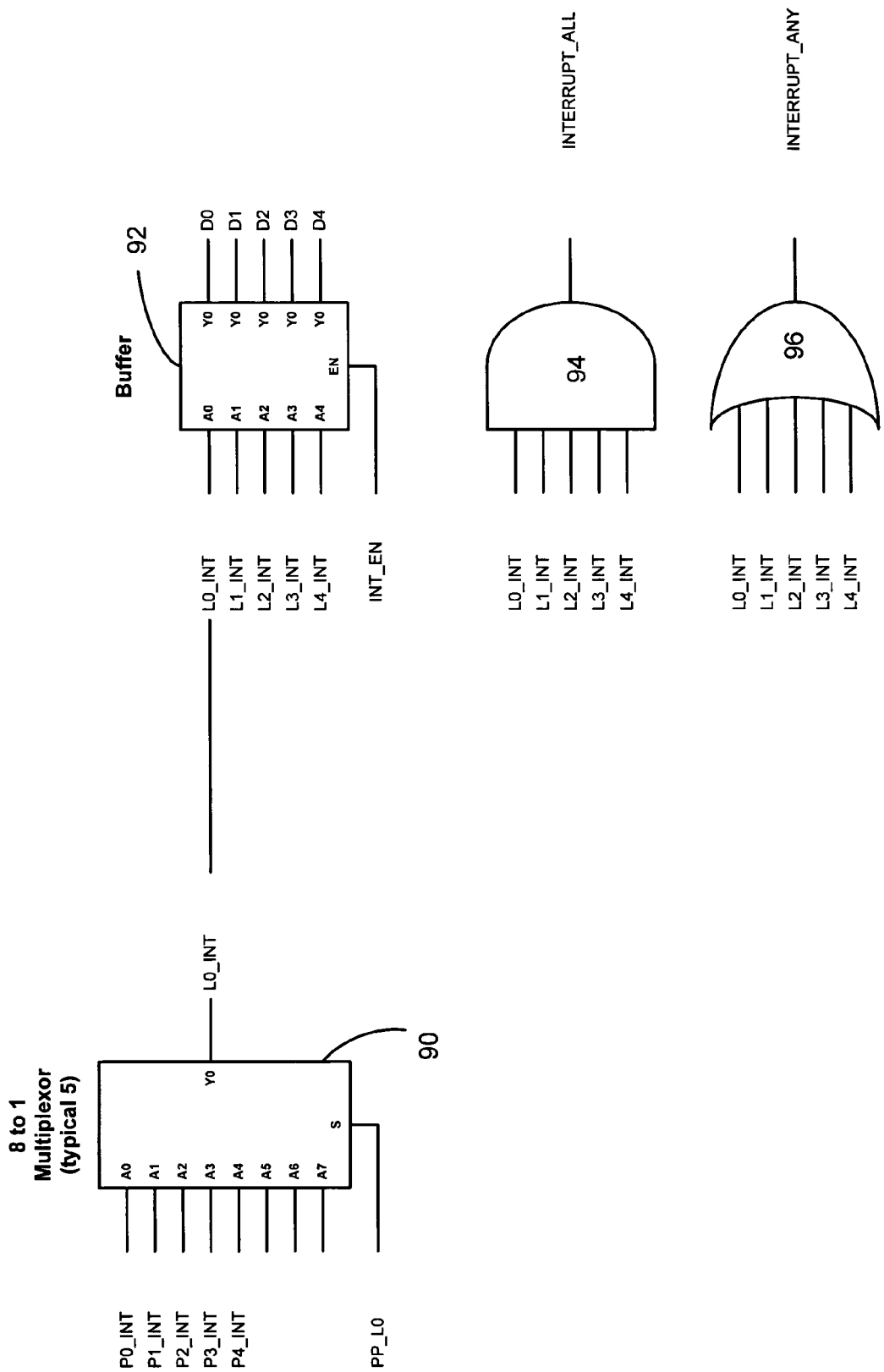
FIG. 9 illustrates interrupt signal logic for associating with logical drives.

The preceding discussion dealt with generating many of the physical port outputs and showed how they were steered by the Mapping Register. Each of these ports has a number of input signals as well. Once again, associating these signals with logical drives can minimize the software overhead. For example, each of the drives has an interrupt output used to signal the need for service from the controller. FIG. 9 shows the use of a multiplexor 90 controlled by PP_L0 value from the Mapping Register to select the interrupt of the physical port associated with logical data port zero. Each of the other logical data ports has an identical multiplexor (not shown) that uses the corresponding PP_Ln value to locate its interrupt. In FIG. 9, the buffer 92 takes the selected interrupts from each of the logical data port multiplexors (90 etc.). When the local processor (20 in FIG. 1) reads the interrupt status through this buffer, the interrupts appear in logical data port order starting with logical data port zero in the bit zero position. The same technique can be used to sort both internal and external signals from the physical data ports, including drive cable ID signals and internal FIFO status signals. This feature enables the local firmware to use a common sequence of code for multiple arrays with different numbers of physical ports. Once the interrupt buffer 92 is loaded, the required status bits are always the least significant bits of the "sorted" register for any array selected. The number of bits may be masked down to the actual number of ports.

Interrupts ANY and ALL

The selected interrupts from the logical data ports can be logically ANDed 94 and ORed 96 as shown in FIG. 9 to provide signals "Interrupt ALL" and Interrupt ANY". When the local processor has issued a command, and before any data has been transferred, it might want to know about an interrupt from ANY of the drives as one or more drives may have rejected the command or had some other error. Once the drives have begun to transfer data, the local processor will want to know when ALL of the drives have asserted their interrupt signals as this indicates the completion of the command. Note that this type of implementation makes the software independent of the number of drives. (For a two-drive array, the interrupt signal from each device appears twice while in a single drive array, the same drive appears four times. The AND and ALL signals still function correctly.)

Logical Address Mapping

While the bulk of the run-time software takes advantage of global commands and status described above there is still the requirement to access individual devices for initialization and for handling errors within specific devices. For this purpose, each of the physical data ports appears at unique location within the local processor address space. When an access to any of these locations is decoded, the decoded output if remapped according to the contents of the Mapping Register. During initialization, the Mapping Register is loaded with an "identity" pattern, i.e. logical device 0 points to physical port 0, logical device 1 points to physical port 1, etc. This makes the physical ports appear in order starting with first physical port location in the processor's address space. In normal operation the Mapping Register will be loaded with a logical to physical drive map. If an interrupt is then received from logical port 2, the local processor may access the interrupting drive through the unique address space that accessed physical port 2 when the identity map is loaded. This makes the servicing of logical drives independent of the physical data port to which they are attached.

Figure 10:
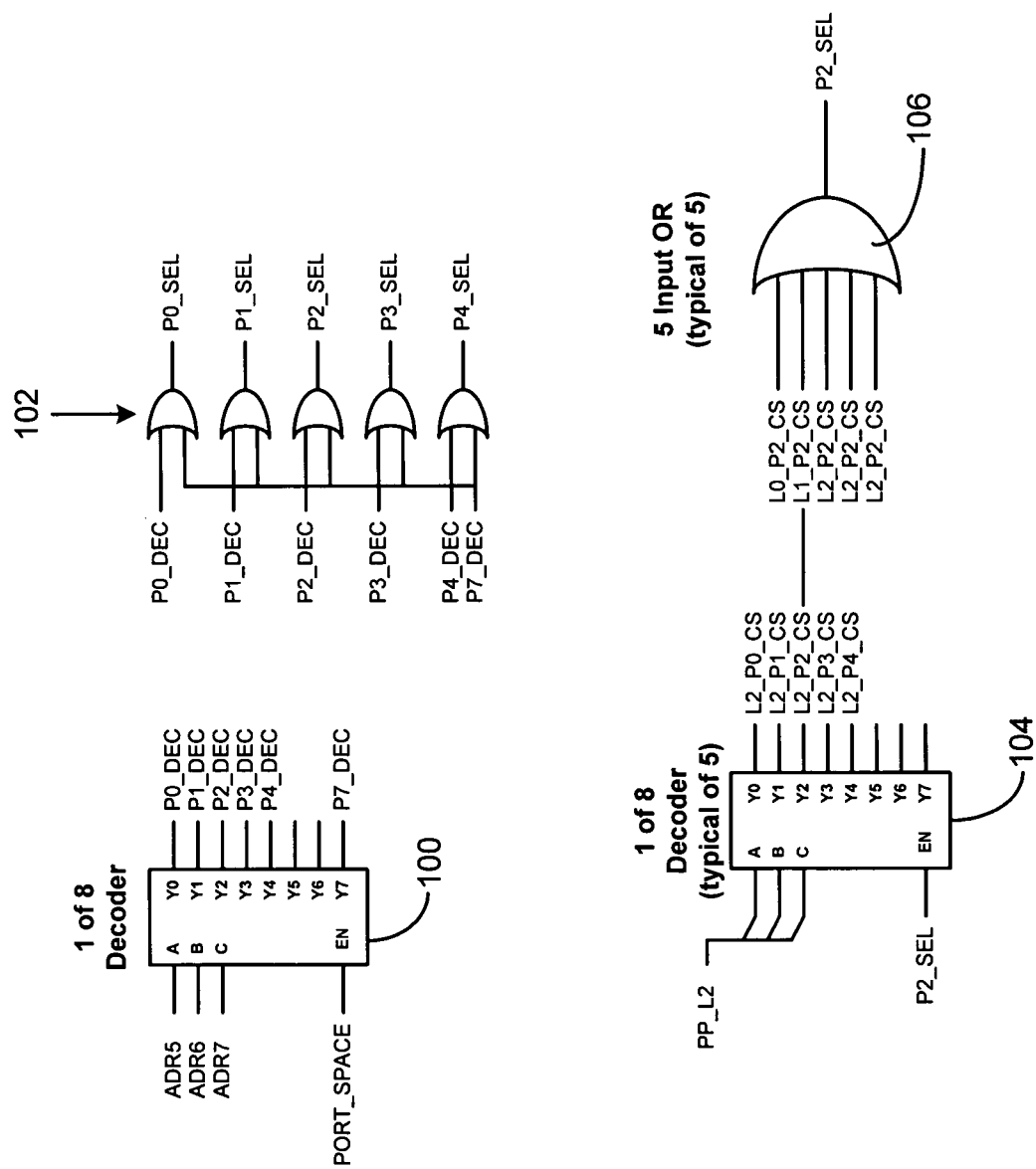
FIG. 10 illustrates a hardware implementation of logical addressing.

One hardware implementation of the logical addressing feature is shown in FIG. 10. When the processor accesses the address region for the device port space, the one of eight decoder 100 decodes processor address lines five through seven defining thirty-two byte spaces for each of the devices. The decoding of each space asserts the corresponding port N decode signal, Pn_DEC. The decoding of the virtual port number seven is the signal for a global access. The P7_DEC signal or ORed with each of the other decode signals 102 so that the resulting port select signals Pn_SEL (n=0-4) are asserted both for a specific access of that port and for a global access.

Each of the port select signals is then steered by the PP_Ln values from the Mapping Register. The one-of-eight decoder 104 takes the P2_SEL signals and routes it according to the PP_L2 value from the Mapping Register producing a set of signals of the form L2_P0_CS indicating a chip select from physical port zero from logical port two. The one-of-eight decoders for the other four logical ports are identical (not shown).

Each physical port has a five-input OR gate, for example 106. The OR gate 106 for physical port #2 is shown. It ORs together the five different sources for a chip select to physical port #2. Note that for a single-drive sub-array, the chip select will be asserted by all four logical devices and for a dual drive sub-array, the chip select is asserted by two of the logical devices.

In the foregoing description and in the drawings we illustrated several examples of one type of mapping register; it can be called a logical mapping register. As explained, it provides a field for each logical drive in a defined array, and in that field, a value indicates a corresponding physical port number. In an alternative embodiment, called a physical mapping, a register provides a field for each physical port or attached drive, and in each field, a value indicates a corresponding logical port number. This alternative mapping register is illustrated in the following example.

Assume an array is to be defined for striped data over four drives. Blocks of the stripe width are stored on each of the available drives in a specific sequence. This process is then repeated. For example, the first block of data (as well as the 5th, 9th, etc) is stored on the drive connected to physical port #1. The second block (as well as 6th, 10th, etc) is stored on the drive connected to physical port #2. The third block of data (as well as 7th, 11th, etc) is stored on the drive connected to physical port #4. The first block of data goes on logical drive 0, the second on logical drive 1, the third on logical drive two and the fourth on logical drive 3. The two alternative types of mapping registers for this case are as follows:

Logical Mapping

| Logical Port # | 3 | 2 | 1 | 0 |
|---|---|---|---|---|
| Value (Physical Port) | 0 | 4 | 2 | 1 |

Physical Mapping:

| Physical Port # | 4 | 3 | 2 | 1 | 0 |
|---|---|---|---|---|---|
| Value (Logical Port #) | 2 | — | 1 | 0 | 3 |

It will be obvious to those having skill in the art that many changes may be made to the details of the above-described embodiments without departing from the underlying principles of the invention. The scope of the present invention should, therefore, be determined only by the following claims.

The invention claimed is:

1. A disk array controller comprising:
a host interface for connection to a host system;
a buffer for storing read and write data; and
a disk interface; the disk interface including a plurality of physical ports for attaching disk drives;
the disk interface further including a switch that implements selectable data paths between the physical ports and the buffer; and
a mapping register for storing mapping data, wherein the switch is configurable in response to the mapping data stored in the mapping register for accessing an array of physical ports defined by the mapping data.

2. A disk array controller according to claim 1 wherein the mapping data reflects a striping order among the physical ports and the switch sorts data segments from the physical ports into logical port order.

3. A disk array controller according to claim 2 wherein the mapping data defines the striping order in terms of a specified sequence of physical ports.

4. A disk array controller according to claim 3 wherein the mapping data are stored in a memory in a controller.

5. A disk array controller according to claim 1 wherein:
the disk interface includes a series of logical ports, each logical port for transferring a corresponding segment of data between the disk interface and the buffer; and
the mapping data comprises a plurality of fields that define a desired disk array and striping scheme by specifying an association of each logical port to one of the physical ports.

6. A disk array controller according to claim 5 wherein the mapping data is organized as a logical mapping register, comprising a field for each logical port, and a value stored in that field indicating a corresponding physical port.

7. A disk array controller according to claim 6 wherein a single physical port is mapped to a plurality of logical ports, the plurality of logical ports transferring data on successive cycles to the single physical port.

8. A disk array controller according to claim 5 wherein the mapping data is organized as a physical mapping register, comprising a field for each physical port of a controller, and a value stored in that field indicating a corresponding logical port.

9. A disk array controller according to claim 5 wherein the desired disk array is defined by association of the logical ports to a sub-set of the available physical ports.

10. A disk array controller according to claim 5 wherein the mapping register includes a field for indicating whether or not a redundant drive is used in the array to store redundant data.

11. A disk array controller according to claim 5 wherein:
the mapping data defines a disk array that includes a number of physical ports equal to one-half the number of logical ports used in data transfer between the disk interface and the buffer; and
the switch is dynamically reconfigurable to provide first data paths between a first half of the logical ports and the associated physical ports for a first disk access, and then provide second data paths between the other half of the logical ports and the associated physical ports for a second disk access to complete a buffer transfer.

12. A disk array controller according to claim 11 wherein the mapping data defines an association of four logical ports to a disk array of two physical ports.

13. A disk array controller according to claim 5 wherein:
the mapping data defines a disk array that includes a number of physical ports that is less than the number of logical ports used in data transfer between the disk interface and the buffer; and
the switch is dynamically reconfigurable to provide first data paths between a first subset of the logical ports and the associated physical ports, and then provide second data paths between a second subset of the logical ports and the associated physical ports.

14. A disk array controller according to claim 5 wherein the switch directs disk write data segments from the buffer to the physical ports so as to stripe the data across the defined disk array as specified in the mapping data.

15. A method of broadcasting a command to an array of disk drives, the method comprising the steps of:
storing indicia in a mapping register that define a disk array by identifying a plurality of physical ports;
asserting a byte of a command onto a data bus of each of the identified physical ports;
asserting a global write strobe to all of the identified physical ports; and
responsive to the mapping register contents, selecting only the physical ports included in the defined array, so that only the selected ports respond to the global write strobe.

16. A method of globally reading control status from a disk array comprising:
storing indicia in a mapping register that define a disk array by identifying a plurality of physical ports;
broadcasting a single global read strobe to all of the identified physical ports;
responsive to the mapping register contents, selecting only the identified physical ports included in the defined array, so that only the selected ports respond to the global read strobe by returning the requested control status;
latching the returned control status in each of the identified physical ports; and then
separately accessing each of the identified physical ports to obtain the respective control status.

17. A disk array controller comprising:
a host interface for connection to a host system;
a buffer for storing read and write data; and a disk interface; the disk interface including a plurality of physical ports for attaching disk drives;

the disk interface further including a switch that implements selectable data paths between the physical ports and the buffer;

a mapping register for storing mapping data, the mapping data defining a desired disk drive array by specifying an association of each of a plurality of logical ports to one of the physical ports;

wherein the switch is configurable in response to the mapping data for accessing the physical ports as defined by the mapping data;

the switch including disk read XOR logic to generate a boolean XOR function of selected disk read data from the physical ports; and the switch including multiplexer logic for each logical port to implement a data path from a selected one at a time of the physical ports and the disk read XOR logic, to the buffer, the read data source selected in accordance with the corresponding mapping data.

18. A disk array controller according to claim 17 wherein the disk read XOR logic is implemented in hardware disposed in the data path for operation "on-the-fly".

19. A disk array controller according to claim 17 wherein the data path multiplexer logic is implemented in hardware.

20. A disk array controller according to claim 17 wherein the mapping data comprises one field for each logical port.

21. A disk array controller according to claim 17 wherein the mapping data includes an indication for implementing a redundant drive in the defined array.

22. A disk array controller according to claim 17 wherein the mapping data comprises one field for each logical port and the switch includes logic for decoding at least one logical port field of the mapping data to form a corresponding series of path signals, each path signal indicating a path from the corresponding logical port to the associated physical port, for qualifying data flow along the indicated path.

23. A disk array controller comprising:
a host interface for connection to a host system;
a buffer for storing read and write data; and
a disk interface; the disk interface including a plurality of physical ports for attaching disk drives;

the disk interface further including a switch that implements selectable data paths between the physical ports and the buffer;

a mapping register for storing mapping data, the mapping data defining a desired disk drive array by specifying an association of each of a plurality of logical ports to one of the physical ports;

wherein the switch is configurable in response to the mapping data for accessing the physical ports as defined by the mapping data;

the switch including disk write XOR logic to generate a boolean XOR function of selected disk write data from the logical ports; and the switch including boolean AND/OR logic for each physical port to implement a data path from a selected one at a time of the logical ports and the disk write XOR logic, to the corresponding physical port, the write data source selected in accordance with the corresponding mapping data.

24. A disk array controller according to claim 23 wherein the disk write XOR logic is implemented in hardware disposed in the data path for operation "on-the-fly".

25. A disk array controller according to claim 23 wherein the boolean AND/OR logic is implemented in hardware.

26. A disk array controller according to claim 23 wherein the mapping data comprises one field for each logical port.

27. A disk array controller according to claim 26 wherein the field is utilized to derive a data source for at least one physical port.

* * * * *